(12) United States Patent
Shen et al.

(10) Patent No.: US 11,877,716 B2
(45) Date of Patent: Jan. 23, 2024

(54) DETERMINING REGION ATTRIBUTE

(71) Applicant: Hangzhou Ezviz Software Co., Ltd., Hangzhou (CN)

(72) Inventors: Bingwei Shen, Hangzhou (CN); Nicong Jiang, Hangzhou (CN); Jianhua Zhu, Hangzhou (CN); Bin Guo, Hangzhou (CN); Anqiang Du, Hangzhou (CN); Haiqing Jiang, Hangzhou (CN)

(73) Assignee: HANGZHOU EZVIZ SOFTWARE CO., LTD., Zhejiang (CN)

( * ) Notice: Subject to any disclaimer, the term of this patent is extended or adjusted under 35 U.S.C. 154(b) by 314 days.

(21) Appl. No.: 16/762,448

(22) PCT Filed: Oct. 31, 2018

(86) PCT No.: PCT/CN2018/112923
§ 371 (c)(1),
(2) Date: May 7, 2020

(87) PCT Pub. No.: WO2019/091310
PCT Pub. Date: May 16, 2019

(65) Prior Publication Data
US 2020/0359867 A1 Nov. 19, 2020

(30) Foreign Application Priority Data
Nov. 8, 2017 (CN) .......................... 201711090900.X

(51) Int. Cl.
*A47L 9/28* (2006.01)
*G06K 9/20* (2006.01)
(Continued)

(52) U.S. Cl.
CPC ............. *A47L 9/2852* (2013.01); *A47L 9/009* (2013.01); *A47L 9/2826* (2013.01);
(Continued)

(58) Field of Classification Search
CPC ...... A47L 11/24; A47L 11/40; A47L 11/4011; A47L 11/4061; A47L 2201/04;
(Continued)

(56) References Cited

U.S. PATENT DOCUMENTS

2004/0096083 A1\* 5/2004 Matsunaga ............ B25J 9/1676
382/104
2005/0251457 A1\* 11/2005 Kashiwagi ......... G06Q 30/0601
705/26.1
(Continued)

FOREIGN PATENT DOCUMENTS

CN 101101203 1/2008
CN 103472823 12/2013
(Continued)

OTHER PUBLICATIONS

WO-2015039621-A1—English machine translation (Year: 2015).\*
(Continued)

*Primary Examiner* — Marc Carlson
(74) *Attorney, Agent, or Firm* — Getech Law LLC; Jun Ye

(57) ABSTRACT

Methods, apparatus and systems for determining a region attribute, and electronic devices are provided. In one aspect, a method includes: identifying a marker line in a target map, the target map being a map of a to-be-cleaned target scene, an intelligent cleaning device relying on the target map during a cleaning process, determining an enclosed region and an unenclosed region with a first position as a reference point in the target map, based on the identified marker line and an auxiliary object in the target map, the auxiliary object including a map boundary and an obstacle, the first position being a position of a preset reference object in the target map, determining the enclosed region as a user-defined cleaning region for the cleaning process of the intelligent cleaning device, and determining the unenclosed region as a
(Continued)

normal cleaning region for the cleaning process of the intelligent cleaning device.

18 Claims, 7 Drawing Sheets

(51) Int. Cl.
*G06K 9/46* (2006.01)
*G06N 5/02* (2023.01)
*A47L 9/00* (2006.01)

(52) U.S. Cl.
CPC .............. *A47L 9/2894* (2013.01); *G06N 5/02* (2013.01); *A47L 2201/04* (2013.01); *G06V 2201/07* (2022.01)

(58) Field of Classification Search
CPC .... A47L 2201/06; A47L 9/009; A47L 9/2826; A47L 9/2852; A47L 9/2894; G06N 5/02; G06V 10/225; G06V 10/235; G06V 10/44; G06V 2201/07
See application file for complete search history.

(56) References Cited

U.S. PATENT DOCUMENTS

| | | | | |
|---|---|---|---|---|
| 2008/0273791 | A1* | 11/2008 | Lee | G05D 1/0274 |
| | | | | 382/173 |
| 2011/0211731 | A1 | 9/2011 | Lee et al. | |
| 2014/0343783 | A1* | 11/2014 | Lee | G05D 1/0011 |
| | | | | 701/25 |
| 2017/0131721 | A1* | 5/2017 | Kwak | G05D 1/0274 |
| 2017/0215680 | A1* | 8/2017 | Chang | G05D 1/0274 |
| 2017/0265703 | A1* | 9/2017 | Park | G05D 1/0044 |
| 2018/0255998 | A1 | 9/2018 | Chang | |
| 2019/0133402 | A1* | 5/2019 | Xie | A47L 9/2852 |

FOREIGN PATENT DOCUMENTS

| | | | |
|---|---|---|---|
| CN | 104161487 | | 11/2014 |
| CN | 104460663 | | 3/2015 |
| CN | 106272420 | A | 1/2017 |
| CN | 106652756 | | 5/2017 |
| CN | 106774294 | | 5/2017 |
| CN | 106793905 | | 5/2017 |
| CN | 106983460 | | 7/2017 |
| CN | 107028558 | | 8/2017 |
| CN | 107239074 | | 10/2017 |
| CN | 107328417 | | 11/2017 |
| EP | 2804065 | A1 | 11/2014 |
| EP | 3184014 | A1 | 6/2017 |
| JP | 2016019029 | | 2/2016 |
| TW | 201726044 | | 8/2017 |
| WO | WO 2014050689 | | 4/2014 |
| WO | WO-2015039621 | A1 * | 3/2015 ........... G05D 1/0016 |

OTHER PUBLICATIONS

CN Office Action and Search Report in Chinese Application No. 201711090900.X, dated Nov. 28, 2019, 19 pages (with English translation).

ISA State Intellectual Property Office of the People's Republic of China, International Search Report in International Appln. No. PCT/CN2018/112923, dated Feb. 3, 2019, 6 pages.

State Intellectual Property Office of the People's Republic of China, Office Action and Search Report Issued in Application No. 201711090900X, dated May 25, 2020, 23 pages, (Submitted with Machine Translation).

ISA State Intellectual Property Office of the People's Republic of China, Written Opinion of the International Searching Authority Issued in Application No. PCT/CN2018/112923, dated Feb. 3, 2019, WIPO, 9 pages.

Extended European Search Report of European Application No. 18876322.1—10 pages (dated Dec. 22, 2020).

* cited by examiner

DETERMINING REGION ATTRIBUTE

CROSS-REFERENCE TO RELATED APPLICATIONS

The present disclosure is a U.S. National Phase application under 35 U.S.C. § 371 of International Patent Application No. PCT/CN2018/112923, entitled "REGION ATTRIBUTE DETERMINATION" and filed on Oct. 31, 2018, which claims the priority to the Chinese Patent Application No. 201711090900.X entitled "METHOD, APPARATUS AND SYSTEM FOR DETERMINING REGION ATTRIBUTE AND ELECTRONIC DEVICE" and filed on Nov. 8, 2017, the disclosure of which is incorporated herein by reference in its entirety.

TECHNICAL FIELD

The present disclosure generally relates to the field of artificial intelligence, and more particularly, to a method, an apparatus and a system for determining a region attribute, and an electronic device.

BACKGROUND

An intelligent cleaning device, such as a cleaning robot, is a popular type of intelligent electrical appliance. It can automatically complete the cleaning work in a to-be-cleaned scene by virtue of artificial intelligence.

In order to implement intelligent region partitioning, an intelligent cleaning device is usually equipped with a virtual wall. A virtual wall is a physical device that emits signals that can be sensed by an intelligent cleaning device to form a virtual wall, to prevent the intelligent cleaning device from going to a specific region to perform cleaning.

Although the intelligent cleaning device implements intelligent region partitioning with a virtual wall during intelligent cleaning, the intelligent cleaning device has to be equipped with a virtual wall which is physical, resulting in a higher cost. Moreover, since the virtual wall requires power supply, it is not convenient to apply the virtual wall.

SUMMARY

In view of this, the present disclosure provides a method, an apparatus and a system for determining a region attribute, and an electronic device, so as to reduce the cost when the intelligent cleaning device implements intelligent region partitioning.

Specifically, the present disclosure is implemented through the following technical solutions.

In a first aspect, the present disclosure provides a method of determining a region attribute, including: identifying a marker line in a target map, wherein the target map is a map of a to-be-cleaned target scene, which an intelligent cleaning device relies on during a cleaning process; determining an enclosed region and an unenclosed region with a first position as a reference point in the target map, based on the identified marker line and an auxiliary object in the target map, wherein the auxiliary object includes a map boundary and an obstacle, and the first position is a position of a preset reference object in the target map; determining the enclosed region as a user-defined cleaning region for the cleaning process of the intelligent cleaning device; and determining the unenclosed region as a normal cleaning region for the cleaning process of the intelligent cleaning device.

In a second aspect, the present disclosure provides an apparatus for determining a region attribute, including: a marker line identifying unit configured to identify a marker line in a target map, wherein the target map is a map of a to-be-cleaned target scene, which an intelligent cleaning device relies on during a cleaning process; an enclosed-unenclosed region determining unit configured to determine an enclosed region and an unenclosed region with a first position as a reference point in the target map, based on the identified marker line and an auxiliary object in the target map, wherein the auxiliary object includes a map boundary and an obstacle, and the first position is a position of a preset reference object in the target map; and a region attribute determining unit configured to determine the enclosed region as a user-defined cleaning region for the cleaning process of the intelligent cleaning device, and determine the unenclosed region as a normal cleaning region for the cleaning process of the intelligent cleaning device.

In a third aspect, the present disclosure provides an electronic device including: an internal bus, a memory, a processor, and a communication interface; wherein the processor, the communication interface, and the memory communicate with each other through the internal bus; the memory is configured to store machine-executable instructions corresponding to the method of determining a region attribute; and the processor is configured to read the machine-readable instructions on the memory and execute the instructions to implement the following operations: identifying a marker line in a target map, wherein the target map is a map of a to-be-cleaned target scene, which an intelligent cleaning device relies on during a cleaning process; determining an enclosed region and an unenclosed region with a first position as a reference point in the target map, based on the identified marker line and an auxiliary object in the target map, wherein the auxiliary object includes a map boundary and an obstacle, and the first position is a position of a preset reference object in the target map; determining the enclosed region as a user-defined cleaning region for the cleaning process of the intelligent cleaning device; and determining the unenclosed region as a normal cleaning region for the cleaning process of the intelligent cleaning device.

In a fourth aspect, the present disclosure provides an intelligent cleaning system, including: a mobile terminal and an intelligent cleaning device; wherein the mobile terminal is configured to obtain a user instruction about a marker line in a target map, and send the user instruction to the intelligent cleaning device, so that the intelligent cleaning device identifies a marker line in the target map based on the user instruction, wherein the target map is a map of a to-be-cleaned target scene, which the intelligent cleaning device relies on during a cleaning process; and the intelligent cleaning device is configured to identify the marker line in a target map; determine an enclosed region and an unenclosed region with a first position as a reference point in the target map, based on the identified marker line and an auxiliary object in the target map, wherein the auxiliary object includes a map boundary and an obstacle, and the first position is a position of a preset reference object in the target map; determine the enclosed region as a user-defined cleaning region for the cleaning process of the intelligent cleaning device, and determine the unenclosed region as a normal cleaning region for the cleaning process of the intelligent cleaning device; and clean the target scene based on the determined user-defined cleaning region and normal cleaning region.

In a fifth aspect, the present disclosure provides an intelligent cleaning system, including: a mobile terminal, a cloud server, and an intelligent cleaning device; wherein the mobile terminal is configured to obtain a user instruction about a marker line in a target map, and send the user instruction to the cloud server, so that the cloud server identifies a marker line in the target map based on the user instruction, wherein the target map is a map of a to-be-cleaned target scene, which the intelligent cleaning device relies on during a cleaning process; and the cloud server is configured to identify the marker line in a target map; determine an enclosed region and an unenclosed region with a first position as a reference point in the target map, based on the identified marker line and an auxiliary object in the target map, wherein the auxiliary object includes a map boundary and an obstacle, and the first position is a position of a preset reference object in the target map; and determine the enclosed region as a user-defined cleaning region for the cleaning process of the intelligent cleaning device, and determine the unenclosed region as a normal cleaning region for the cleaning process of the intelligent cleaning device; and the intelligent cleaning device is configured to clean the target scene based on the determined user-defined cleaning region and normal cleaning region.

In the solution provided by the present disclosure, the user can provide a marker line in the target map to partition the region according to the cleaning demands, and then the marker line in the target map is identified during process of determining the region attribute. Based on the identified marker line and an auxiliary object in the target map, an unenclosed region and an enclosed region are determined, and the unenclosed region is determined as a normal cleaning region and the enclosed region is determined as a user-defined cleaning region. Since it does not require a virtual wall device, and intelligent region partitioning can be performed based on the user's personalized cleaning demands, the cost of implementing intelligent region partitioning can be reduced.

DETAILED DESCRIPTION OF THE EMBODIMENTS

Figure 1:
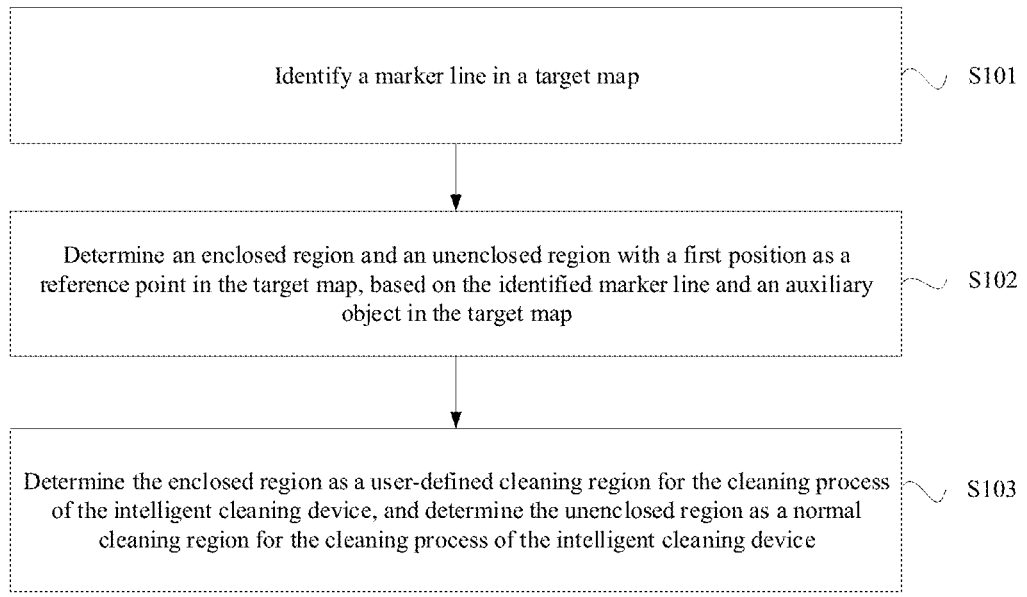
FIG. 1 is a flowchart illustrating a method of determining a region attribute according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present disclosure to describe various information, such information should not be limited to these terms. These terms are only used to distinguish one category of information from another. For example, without departing from the scope of the present disclosure, first information can be referred as second information; and similarly, second information can also be referred as first information. Depending on the context, the word "if" as used herein can be interpreted as "when" or "upon" or "in response to determining".

In order to solve the problems in the prior art, the present disclosure provides a method and an apparatus for determining a region attribute, and an electronic device, so as to solve the problems of high cost and inconvenience caused by implementing intelligent region partitioning in the prior art.

First, a method of determining a region attribute provided in the present disclosure will be described below.

It should be noted that an entity performing the method of determining a region attribute provided in the present disclosure can be an apparatus for determining a region attribute. The apparatus for determining a region attribute can be functional software running in an intelligent cleaning device. At this time, the intelligent cleaning device may clean a target scene according to a user-defined cleaning region and a normal cleaning region determined by the intelligent cleaning device. Of course, the apparatus for determining a region attribute can also be functional software running in a cloud server corresponding to the intelligent cleaning device. At this time, the intelligent cleaning device may clean a target scene according to a user-defined cleaning region and a normal cleaning region determined by the cloud server. Specifically, the intelligent cleaning device includes, but is not limited to, a cleaning robot. The so-called cleaning robot can also be referred to as an automatic cleaner, an intelligent vacuum cleaner, a robot vacuum cleaner, and the like.

As shown in FIG. 1, a method of determining a region attribute provided in the present disclosure can include the following steps S101-S103.

At S101, a marker line in a target map is identified. The target map is a map of a to-be-cleaned target scene, which the intelligent cleaning device relies on during a cleaning process. In addition, the marker line can include, but is not limited to, a straight line, a polyline, or a polygon.

In order to realize intelligent region partitioning of the to-be-cleaned target scene, a map corresponding to the target scene, that is, a target map, can be constructed in advance.

When the to-be-cleaned target scene is partitioned based on individual demands of a user, the user can draw a marker line in the target map based on an region partitioning idea of setting different cleaning attributes for an unenclosed region and an enclosed region, to distinguish between an unenclosed region and an enclosed region with the marker line drawn.

Moreover, the target map of the target scene can be constructed by the intelligent cleaning device, or can be shared by other electronic devices, such as other intelligent cleaning devices of the same type or different types, to the intelligent cleaning device. It should be noted that when constructing the target map of the target scene, one or more of laser, radar, ultrasound, and vision cameras can be used. The specific construction technology can be any map construction technology well-known in the art, which is not limited here. In addition, it should be noted that when the apparatus for determining a region attribute is running on the intelligent cleaning device, the target map used by the intelligent cleaning device when determining the region attribute can be constructed by the intelligent cleaning device per se, or can be obtained by sharing with other devices. When the apparatus for determining a region attribute runs on a cloud server corresponding to the intelligent cleaning device, the target map used by the cloud server when determining the region attribute can be obtained by uploading from the intelligent cleaning device corresponding to the cloud server, or can also be obtained by uploading from other devices.

It can be understood that in one implementation, when the apparatus for determining a region attribute runs on the intelligent cleaning device, the intelligent cleaning device can display the target map through a display screen of the intelligent cleaning device. In this case, the user can issue a user instruction about the marker line in the target map, such as issuing a user instruction by drawing a marker line or issuing a user instruction by giving coordinate information. Further, the intelligent cleaning device can obtain a user instruction about the marker line, and identify the marker line in the target map based on the user instruction. Of course, in another implementation, when the apparatus for determining a region attribute is running on the intelligent cleaning device, the target map can be displayed through a mobile terminal in communication with the intelligent cleaning device. In this case, the user can issue a user instruction about the marker line in the target map displayed by the mobile terminal, such as issuing a user instruction by drawing a marker line or issuing a user instruction by giving coordinate information. Further, the intelligent cleaning device can obtain a user instruction about the marker line from the mobile terminal, and identify the marker line in the target map based on the user instruction.

When the apparatus for determining a region attribute is running on a cloud server corresponding to the intelligent cleaning device, the target map can be displayed through a mobile terminal in communication with the intelligent cleaning device. In this case, the user can issue a user instruction about the marker line in the target map displayed by the mobile terminal, such as issuing a user instruction by drawing a marker line or issuing a user instruction by giving coordinate information. Further, the cloud server can obtain a user instruction on the marker line from the mobile terminal, and identify the marker line in the target map based on the user instruction.

In addition, it should be noted that the target map is a map that the intelligent cleaning device relies on during cleaning the target scene. When cleaning, the intelligent cleaning device can convert the coordinates in the target map to coordinates in the world coordinate system, and then use the coordinates in the world coordinate system to clean the target scene. How the intelligent cleaning device relies on the target map for cleaning can use any technology well known in the art, which will not be elaborated herein.

Those skilled in the art can understand that the function of drawing a marker line in the target map can be implemented by any technology well known in the art, and in addition, any recognition technology can be used to identify the marker line drawn in the map, which will not be limited here. In addition, the color, thickness, etc. of the marker line can be set by the user.

At S102, an unenclosed region with a first position as a reference point and an enclosed region in the target map are determined based on the identified marker line and an auxiliary object in the target map.

After determining the unenclosed region with the first position as the reference point and the enclosed region in the target map, different cleaning attributes can be set for the enclosed region and the unenclosed region.

The auxiliary object can include a map boundary and an obstacle, and the first position is a position of a preset reference object in the target map. In specific applications, an object with a relatively fixed position is usually selected as the preset reference object. Optionally, the preset reference object can include any one or more of the following: a charging pile of the intelligent cleaning device, or a non-movable object in the target scene other than the charging pile. For example: the non-movable object can be a wardrobe, a bed, a table, or the like.

It should be noted that different types of marker lines correspond to different forms of enclosed regions. The following describes forms of enclosed regions in combination with different marker lines.

Figure 2A:
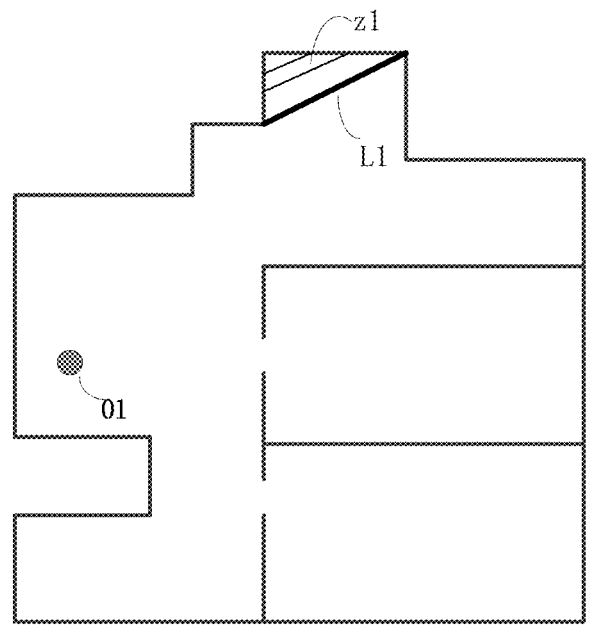
FIG. 2a and FIG. 2b are schematic diagrams illustrating a map having a straight line as a marker line.
Figure 2B:
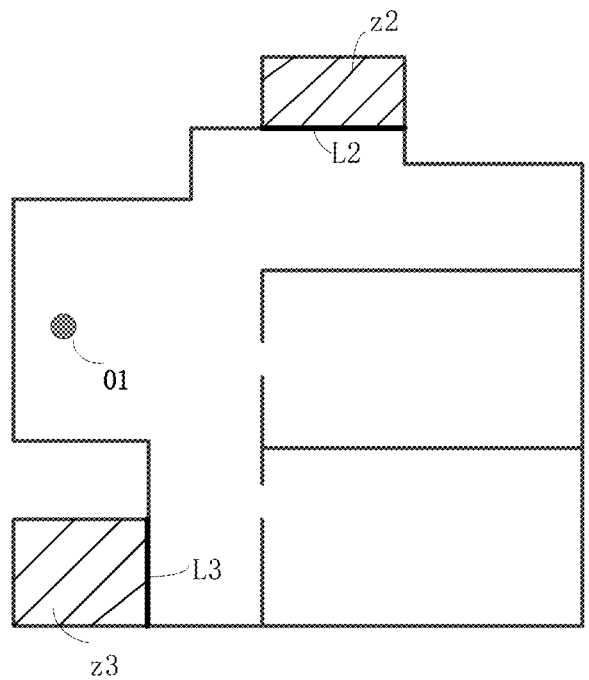

When the marker line is a straight line, the enclosed region is a region enclosed by the marker line and the target auxiliary object and excluding the first position. The target auxiliary object is an auxiliary object that intersects with the marker line in the target map. In a map example shown in FIG. 2a, the preset reference object is a charging pile 01, and the marker line is a straight line L1. The straight line L1 and the map boundary form an enclosed region, that is, the hatched region z1 in FIG. 2a. In a map example shown in FIG. 2b, the preset reference object is the charging pile 01, and the marker line is two straight lines L2 and L3. The straight line L2 and the map boundary form an enclosed region, that is, the hatched region z2 in FIG. 2b, and the straight line L3 and the map boundary form an enclosed region, that is, the hatched region z3 in FIG. 2b.

Figure 3:
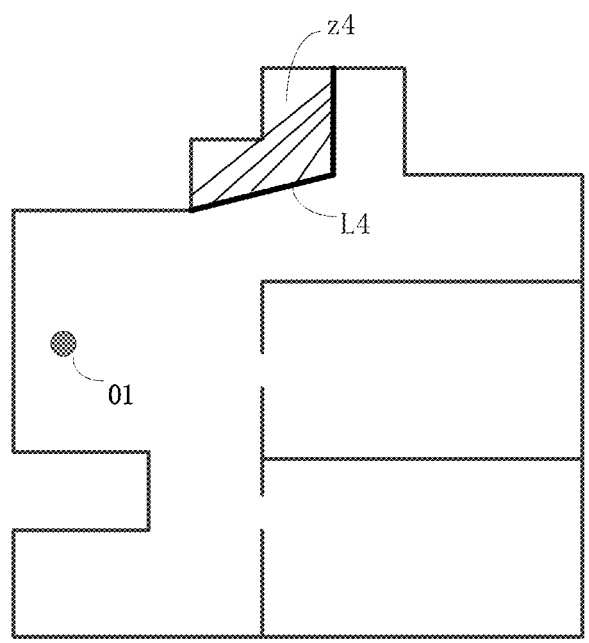
FIG. 3 is a schematic diagram illustrating a map having a polyline as a marker line.

When the marker line is a polyline, the enclosed region is a region enclosed by the marker line and the target auxiliary object and excluding the first position. The target auxiliary object is an auxiliary object that intersects with the marker line in the target map. In a map example shown in FIG. 3, the preset reference object is the charging pile 01, and the marker line is a polyline L4. The polyline L4 and the map boundary form an enclosed region, that is, a hatched region z4 in FIG. 3.

Figure 4:
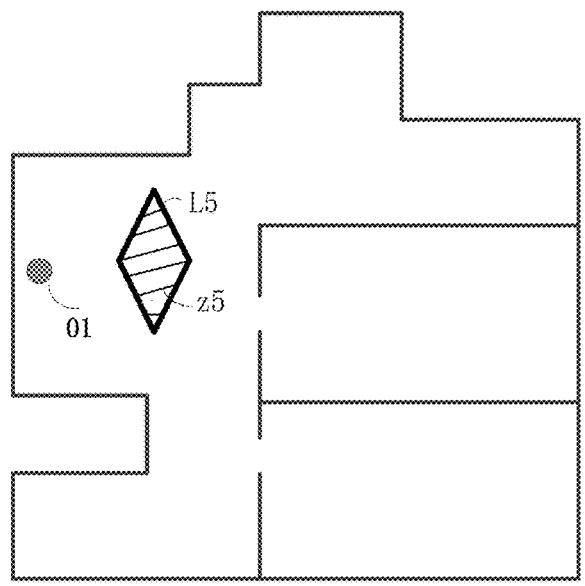
FIG. 4 is a schematic diagram illustrating a map having a polygon as a marker line.

When the marker line is a polygon, the enclosed region is the region enclosed by the sides of the polygon. As shown in a map example shown in FIG. 4, the preset reference object is the charging pile 01, and the marker line is a rhombus L5. The region enclosed by the rhombus L5 is an enclosed region, that is, the hatched region z5 in FIG. 4.

It should be noted that the description of the enclosed region above is merely an exemplary, and should not constitute a limitation on the present disclosure. In addition, after the first position and the marker line are determined, the method for determining an unenclosed region with the first position as the reference point can be any one of the methods for determining an unenclosed region known in the art.

At S103, the enclosed region is determined as a user-defined cleaning region for the cleaning process of the intelligent cleaning device, and the unenclosed region is determined as a normal cleaning region for the cleaning process of the intelligent cleaning device.

After the enclosed region and the unenclosed region are determined, based on an region partitioning idea of setting different cleaning attributes for an unenclosed region and an enclosed region, the enclosed region can be determined as a user-defined cleaning region for the process of cleaning the target scene by the intelligent cleaning device, and the unenclosed region can be determined as a normal cleaning region for the process of cleaning the target scene by the intelligent cleaning device. It can be understood that the normal cleaning region used herein is a region where the intelligent cleaning device performs cleaning in accordance with the normal cleaning procedure during cleaning; and the cleaning category corresponding to the user-defined cleaning region can be set by the user, such as focused cleaning and cleaning prohibited. The focused cleaning used herein requires an intelligent cleaning device to increase cleaning efforts, and the cleaning prohibited does not require intelligent cleaning device to clean.

It should be noted that, in specific applications, because the user's cleaning demands are more diverse, according to the cleaning demands, the user can draw one or more marker lines in the target map to form one or more enclosed regions. In addition, the plurality of marker lines can be of the same type or of different types.

In the solution provided by the present disclosure, the user can draw a marker line in the target map to partition the region according to the cleaning demands, and then the marker line in the target map is identified during process of determining the region attribute. Based on the identified marker line and an auxiliary object in the target map, an unenclosed region and an enclosed region are determined, and the unenclosed region is determined as a normal cleaning region and the enclosed region is determined as a user-defined cleaning region. Since this solution does not require a virtual wall device, and intelligent region partitioning can be performed based on the user's personalized cleaning demands, the cost of implementing intelligent region partitioning can be effectively reduced and the convenience of use can be improved.

In addition, since there is usually no high-precision scale information on the target map, or since obstacles are temporarily moved or added or removed due to user behavior, there is a deviation between a user-defined cleaning region provided by the user on the target map and an actual region desired by the user in the target scene, that is, a desired user-defined cleaning region. In view of this, in order to further improve the accuracy of the intelligent region partitioning, for a marker line of a polygon, when the polygon is a rectangular, the present disclosure also provides a method of determining a region attribute.

Figure 5:
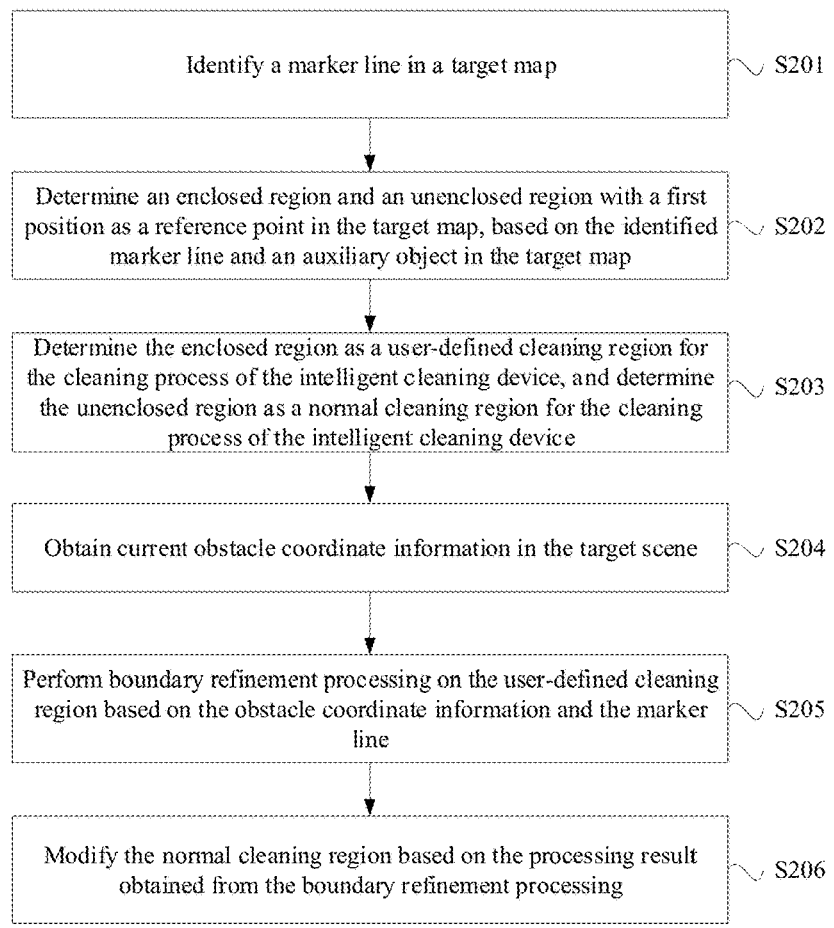
FIG. 5 is a flowchart illustrating a method of determining a region attribute according to another example of the present disclosure.

For a marker line of a rectangular, as shown in FIG. 5, a method of determining a region attribute provided by another example of the present disclosure can include the following steps S201-S206.

At S201, a marker line in a target map is identified.

At S202, an unenclosed region with a first position as a reference point and an enclosed region in the target map are determined based on the identified marker line and an auxiliary object in the target map.

The auxiliary object can include a map boundary and an obstacle, and the first position is a position of a preset reference object in the target map.

At S203, the enclosed region is determined as a user-defined cleaning region for the cleaning process of the intelligent cleaning device, and the unenclosed region is determined as a normal cleaning region for the cleaning process of the intelligent cleaning device.

S201-S203 in this example are similar to S101-S103 in the above example, except that the marker line in this example is a rectangular, while the marker line in the previous example can be a straight line, a polyline, a polygon or the like.

At S204, current obstacle coordinate information in the target scene is obtained.

The obstacle coordinate information is information obtained by the intelligent cleaning device performing obstacle detection on the target scene.

It can be understood that after the user-defined cleaning region and the normal cleaning region are determined, the intelligent cleaning device can perform cleaning based on the user-defined cleaning region and the normal cleaning region, and perform obstacle detection on the target scene during the cleaning process, to modify the two cleaning regions. Alternatively, after the user-defined cleaning region and the normal cleaning region are determined, before cleaning, the intelligent cleaning device can perform obstacle detection on the target scene before cleaning to modify the two cleaning regions.

In addition, when the apparatus for determining a region attribute runs on the intelligent cleaning device, the apparatus for determining a region attribute can directly obtain the obstacle coordinate information detected by the intelligent cleaning device. When the apparatus for determining a region attribute runs on the cloud server corresponding to the intelligent cleaning device, the intelligent cleaning device can upload the detected obstacle coordinate information to the cloud server, and the apparatus for determining a region attribute can obtain the obstacle coordinate information.

In addition, the intelligent cleaning device can detect the coordinates of an obstacle in a coordinate system with the intelligent cleaning device as the origin based on radar, laser, ultrasound, visual camera, and the like. Then, the coordinates of the obstacle in the coordinate system with the intelligent cleaning device as the origin can be directly used as the obstacle coordinate information. Of course, the obstacle coordinate information can also be the coordinates of the obstacle in the world coordinate system. That is, after obtaining the coordinates of the obstacle in the coordinate system with the intelligent cleaning device as the origin, the obtained coordinates are converted into coordinates in the world coordinate system. For the sake of clarity, the conversion relationship between the coordinates in the target map and the coordinates in the world coordinate system and the conversion relationship between the coordinates in the coordinate system with the intelligent cleaning device as the origin and the coordinates in the world coordinate system will be described below.

For a rectangle given by the user, the conversion formula (1) between the coordinates given by the user in the target map and the coordinates in the world coordinate system is as follows:

$$\begin{bmatrix} X_m \\ Y_m \\ 1 \end{bmatrix} = \begin{bmatrix} s*\cos(\theta) & -s*\sin(\theta) & t_x \\ s*\sin(\theta) & s*\cos(\theta) & t_y \\ 0 & 0 & 1 \end{bmatrix} \begin{bmatrix} x \\ y \\ 1 \end{bmatrix}, \quad (1)$$

where $[x\ y]^T$ denotes coordinates in the target map, s denotes a scale factor, $\theta$ denotes a rotation angle of the coordinate system of the target map and the world coordinate system, $[t_x\ t_y]^T$ denotes a translation vector of the coordinate system of the target map and the world coordinate system, and $[X_m\ Y_m]^T$ denotes coordinates in the world coordinate system, in which, s, $\theta$ and $[t_x\ t_y]^T$ are constants that have been determined when the target map is constructed.

Correspondingly, the conversion formula (2) between the coordinates in the coordinate system with the intelligent cleaning device as the origin and the coordinates in the world coordinate system is as follows:

$$\begin{bmatrix} X'_m \\ Y'_m \\ 1 \end{bmatrix} = \begin{bmatrix} \cos(\theta') & -\sin(\theta') & t'_x \\ \sin(\theta') & \cos(\theta') & t'_y \\ 0 & 0 & 1 \end{bmatrix} \begin{bmatrix} x'_r \\ y'_r \\ 1 \end{bmatrix}, \quad (2)$$

where, $[x'_r\ y'_r]^T$ denotes coordinates of an obstacle detected by the intelligent cleaning device in the coordinate system with the intelligent cleaning device as the origin, $\theta'$ denotes a rotation angle of the intelligent cleaning device in the world coordinate system, $[t'_x\ t'_y]^T$ denotes a translation vector of the intelligent cleaning device in the world coordinate system, and $[X'_m\ Y'_m]^T$ denotes coordinates of the obstacle in the world coordinate system, in which $\theta'$ and $[t'_x\ t'_y]^T$ can be determined based on mileage information, and the specific determination method is as follows.

Figure 6:
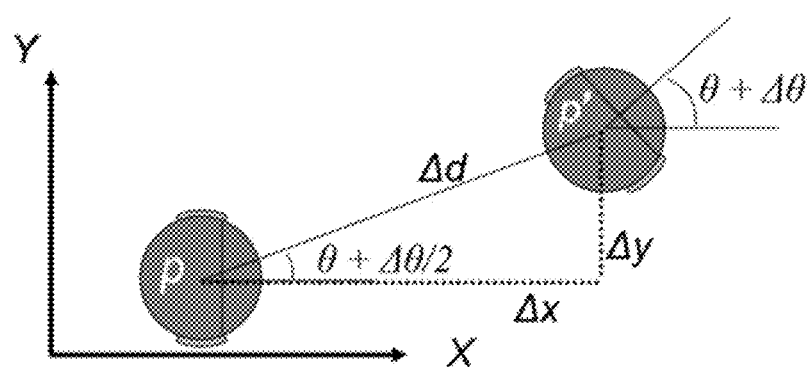
FIG. 6 is a schematic diagram illustrating a position relationship of coordinate points used in a process of obtaining a rotation angle and a translation vector.

As shown in FIG. 6, it is known that coordinates of a point p of the intelligent cleaning device in the world coordinate system at a certain moment are $[x\ y\ \theta]^T$, the coordinates $[x'\ y'\ \theta']^T$ of a point p' of the intelligent cleaning device in the world coordinate system at a next moment (with a sufficiently small interval from the previous moment) can be obtained based on the following formulas (3)-(7).

$$\Delta d = \frac{\Delta s_r + \Delta s_l}{2}, \quad (3)$$

$$\Delta\theta = \frac{\Delta s_r - \Delta s_l}{L}, \quad (4)$$

$$\Delta x = \Delta d\ \cos(\theta + \Delta\theta/2), \quad (5)$$

$$\Delta y = \Delta d\ \sin(\theta + \Delta\theta/2), \quad (6)$$

$$\begin{bmatrix} x' \\ y' \\ \theta' \end{bmatrix} = \begin{bmatrix} x \\ y \\ \theta \end{bmatrix} + \begin{bmatrix} \Delta x \\ \Delta y \\ \Delta\theta \end{bmatrix} = \begin{bmatrix} x \\ y \\ \theta \end{bmatrix} + \begin{bmatrix} \frac{\Delta s_r + \Delta s_l}{2}\cos\left(\theta + \frac{\Delta s_r - \Delta s_l}{2L}\right) \\ \frac{\Delta s_r + \Delta s_l}{2}\sin\left(\theta + \frac{\Delta s_r - \Delta s_l}{2L}\right) \\ \frac{\Delta s_r - \Delta s_l}{L} \end{bmatrix}. \quad (7)$$

where, $\Delta s_l$, $\Delta s_r$ are respectively distances travelled by left and right wheels of the intelligent cleaning device while the intelligent cleaning device is from point p to point p', and the distance can be obtained by related sensors; the forward direction of the intelligent cleaning device is taken as the positive direction; and L is a distance between the left and right wheels of the intelligent cleaning device. Then, when the intelligent cleaning device is located at a point p' in the world coordinate system, the corresponding rotation angle in the world coordinate system is $\theta'$ and the translation vector is $$\begin{bmatrix} t'_x \\ t'_y \end{bmatrix} = \begin{bmatrix} x' \\ y' \end{bmatrix}.$$

At S205, boundary refinement processing is performed on the user-defined cleaning region based on the obstacle coordinate information and the marker line.

After the obstacle coordinate information is obtained, boundary refinement processing can be performed on the user-defined cleaning region with reference to a position relationship between the user-defined cleaning region, that is, the region enclosed by the marker line, and the obstacle in the real environment of the target scene.

In order to make the solution and layout clear, the implementation of boundary refinement processing of the current user-defined cleaning region based on the obstacle coordinate information and the marker line will be described below.

At S206, the normal cleaning region is modified based on the processing result obtained from the boundary refinement processing.

After performing boundary refinement processing on the user-defined cleaning region, the normal cleaning region can be modified based on the processing result obtained from the boundary refinement processing.

In this example, not only the implementation cost of the intelligent region partitioning can be reduced, but also the accuracy of the intelligent region partitioning can be improved.

For the sake of clarity of the solution, some implementations for performing boundary refinement processing on the user-defined cleaning region based on the obstacle coordinate information and the marker line will be described below.

Optionally, in an implementation, the step of performing boundary refinement processing on the user-defined cleaning region based on the obstacle coordinate information and the marker line can include: based on the obstacle coordinate information, upon determining that there is no obstacle in the scene region corresponding to the marker line, outputting first notification information for prompting whether the marking is a mistake; when the result fed back by the user based on the first notification information is yes, identifying a new marker line, determining a new enclosed region corresponding to the identified new line, and adjusting the current user-defined cleaning region to the new enclosed region.

Optionally, in another implementation, the step of performing boundary refinement processing on the user-defined cleaning region based on the obstacle coordinate information and the marker line can include: based on the obstacle coordinate information, upon determining that there is no obstacle in the scene region corresponding to the marker line, based on the obstacle coordinate information, determining whether a distance between the nearest obstacle and a scene region corresponding to the marker line is shorter than a predetermined distance threshold; when determining that the distance between the nearest obstacle and the scene region corresponding to the marker line is shorter than the predetermined distance threshold, outputting second notification information for prompting whether to perform region adjustment based on the nearest obstacle; when the result fed back by the user based on the second notification information is yes, performing single obstacle boundary processing in the target map on the nearest obstacle to obtain a first obstacle boundary, and adjusting the current user-defined cleaning region to the region enclosed by the first obstacle boundary. The nearest obstacle is the obstacle with the closest distance from the scene region corresponding to the marker line in the target scene.

The scene region corresponding to the marker line is: a region corresponding to the enclosed region formed based on the marker line in the actual environment of the target scene.

Based on the obstacle coordinate information, determining whether there is no obstacle in the scene region corresponding to the marker line can be a process of: determining a coordinate set in the world coordinate system corresponding to the coordinate information of each obstacle and a coordinate set in the world coordinate system corresponding to the marker line; determining whether the coordinate set in the world coordinate system corresponding to each obstacle does not have the same coordinates as in the coordinate set in the world coordinate system corresponding to the marker line; and when determining that the coordinate set in the world coordinate system corresponding to each obstacle does not have the same coordinates as in the coordinate set in the world coordinate system corresponding to the marker line, indicating that there is no obstacle in the scene region corresponding to the marker line. As shown in the position relationship of FIG. 7a, an obstacle D is located outside the region corresponding to a rectangle 10, and there is no obstacle inside the rectangle 10. It should be noted that the gray regions in FIGS. 7a and 7b serve as exemplary background regions that carry the rectangle 10 and the obstacle D, and are used to facilitate reflecting the relative position relationship between the rectangle 10 and the obstacle D in the same scene, and it does not have any limiting meaning. Similarly, the gray regions in FIG. 8, FIG. 9, and FIG. 10 function similarly to those in FIG. 7.

Moreover, based on the obstacle coordinate information, an implementation of determining whether the distance between the nearest obstacle and the scene region corresponding to the marker line is less than a predetermined distance threshold can also be implemented based on the position relationship between the coordinate set in the world coordinate system corresponding to the nearest obstacle and the coordinate set in the world coordinate system corresponding to the marker line.

Specifically, the single obstacle boundary processing can include: determining an outer contour coordinate set of a single obstacle in the target map; and from the outer contour coordinate set, determining a vertex coordinate set $V_A$ corresponding to the obstacle; connecting the coordinate points corresponding to the coordinates in the vertex coordinate set $V_A$, and determining a rectangle formed by the connection as a boundary of the obstacle. The vertex coordinate set $V_A$ can be expressed as follows:

$$V_A = \{(x_{min}, y_{min}), (x_{min}, y_{max}), (x_{max}, y_{min}), (x_{max}, y_{max})\}.$$

Figure 7A:
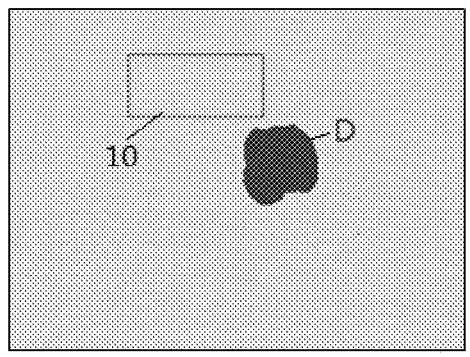
FIG. 7a is a diagram illustrating a position relationship between a rectangle and an obstacle.
Figure 7B:
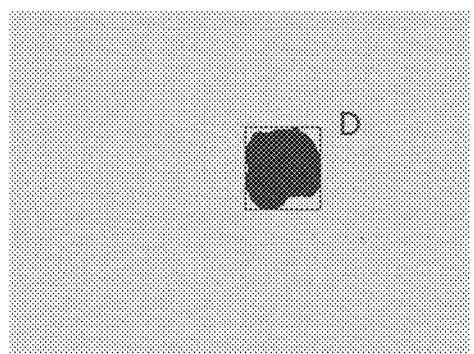
FIG. 7b is a diagram illustrating a result of the obstacle in FIG. 7a that has been subject to a single obstacle boundary processing.
Figure 8A:
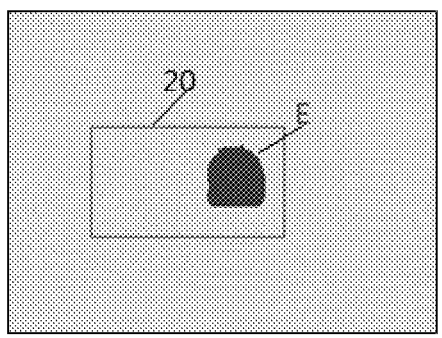
FIG. 8a is a diagram illustrating a position relationship between a rectangle and an obstacle.

As shown in FIGS. 7a and 7b, after the obstacle D in FIG. 7a is performed with a single obstacle boundary processing, the processing result can be seen in FIG. 7b. The outer contour coordinate set of the obstacle in the target map can be obtained by the conversion formula (1) and the conversion formula (2) described above.

In addition, after the first notification information is output, if the user determines that the marking is a mistake, at this time, the user can not only feedback the result yes, but also can draw a new marker line so that the new marker line can be identified later. If the user determines that the marking is right, at this time, the user can feedback the result no, and at this time, the subsequent refinement processing can be skipped.

Similarly, after the second notification information is output, if the user does not want to perform the region adjustment based on the nearest obstacle, the user can feedback the result no, and at this time, the subsequent refinement processing can be skipped. In addition, when it is determined that the distance between the nearest obstacle and the scene region corresponding to the marker line is not less than the predetermined distance threshold based on the obstacle coordinate information, subsequent refinement processing can be skipped, that is, it is considered in default that the current user-defined region is a correct region.

Optionally, in yet another implementation, the step of performing boundary refinement processing on a user-defined cleaning region based on the obstacle coordinate information and the marker line can include: based on the obstacle coordinate information, upon determining that the scene region corresponding to the marker line intersects with a single obstacle, determining an area ratio of the intersecting portion to the intersected obstacle. It should be noted that the intersecting described in the present disclosure refers to there is overlap between the obstacle and the scene region corresponding to the marker line.

When the area ratio is larger than a predetermined ratio threshold, a single obstacle boundary processing on the target map is performed on the intersected obstacle to obtain a second obstacle boundary, and the current user-defined cleaning region is adjusted to a region enclosed by the second obstacle boundary.

When the area ratio is not larger than the predetermined ratio threshold, third notification information for prompting whether the marking is a mistake is output. When the result fed back by the user based on the third notification information is yes, a new marker line is identified, a new enclosed region corresponding to the identified new marker line is determined, and the current user-defined cleaning region is adjusted to the new enclosed region. Alternatively, a single obstacle boundary processing on the target map is performed on the intersected obstacle to obtain a third obstacle boundary, and the current user-defined cleaning region is adjusted to a region enclosed by the third obstacle boundary.

Based on the obstacle coordinate information, determining whether the scene region corresponding to the marker line intersects with a single obstacle can be a process of: determining the coordinate set in the world coordinate system corresponding to the obstacle coordinate information and the coordinate set in the world coordinate system corresponding to the marker line; determining whether the coordinate set in the world coordinate system corresponding to the marker line includes some or all coordinates in the world coordinate system corresponding to the obstacle; and when determining that the coordinate set in the world coordinate system corresponding to the marker line includes some or all coordinates in the world coordinate system corresponding to the obstacle, indicating that the scene region corresponding to the marker line intersects with the single obstacle.

In some examples, the area ratio can be calculated by calculating the area of the region or by calculating the number of same coordinates. Alternatively, in a grid map, the area ratio of the intersecting portion to the intersected obstacle can also be determined by calculating the ratio between the number of grids occupied by the obstacle in the scene region corresponding to the marker line and the number of grids occupied by the obstacle on the map.

After the third notification information is output, if the user determines that the marking is not a mistake, the user can feedback a result no. At this time, subsequent refinement processing can be skipped.

Figure 8B:
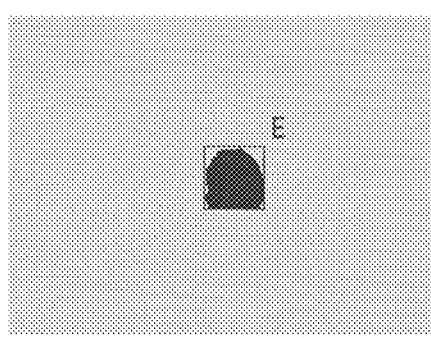
FIG. 8b is a diagram illustrating a result of the obstacle in FIG. 8a that has been subject to a single obstacle boundary processing.
Figure 9A:
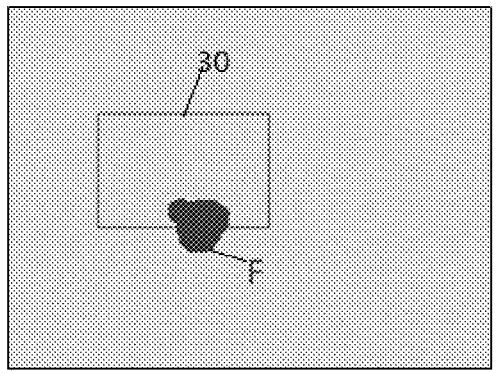
FIG. 9a is a diagram illustrating a position relationship between a rectangle and an obstacle.
Figure 9B:
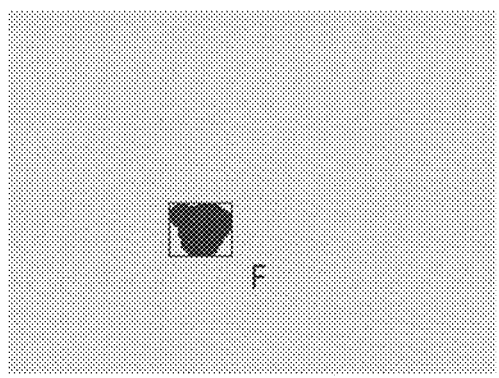
FIG. 9b is a diagram illustrating a result of the obstacle in FIG. 9a that has been subject to a single obstacle boundary processing.

The specific process of the single obstacle boundary processing can refer to the process described in the above implementation, and will not be repeated here. As shown in the position relationship shown in FIG. 8a, the region corresponding to the rectangle 20 contains a single obstacle E; and after the obstacle E has been subject to the single obstacle boundary processing, the processing result is shown in FIG. 8b. As shown in the position relationship shown in FIG. 9a, the region corresponding to the rectangle 30 intersects with a portion of a single obstacle F. In addition, after the obstacle F in FIG. 9a has been subject to a single obstacle boundary processing, the processing result can be seen in FIG. 9b.

Optionally, in another implementation, the step of performing boundary refinement processing on a user-defined cleaning region based on the obstacle coordinate information and the marker line can include: based on the obstacle coordinate information, upon determining that the scene region corresponding to the marker line intersects with at least two obstacles respectively, performing a first-type multiple obstacle boundary processing or a second-type multiple obstacle boundary processing in the target map on the at least two obstacles that are respectively intersected, to obtain a fourth obstacle boundary; and adjusting the current user-defined cleaning region to a region enclosed by the fourth obstacle boundary.

Based on the obstacle coordinate information, determining that the scene region corresponding to the marker line intersects with at least two obstacles can be a process of: determining a coordinate set in the world coordinate system corresponding to the obstacle coordinate information and a coordinate set in the world coordinate system corresponding to the marker line; determining whether the coordinate set in the world coordinate system corresponding to the marker line includes some or all of the coordinates in the world coordinate system corresponding to at least two obstacles; and when determining that the coordinate set in the world coordinate system corresponding to the marker line includes some or all of the coordinates in the world coordinate system corresponding to at least two obstacles, indicating that the scene region corresponding to the marker line intersects with at least two obstacles respectively. As shown in the position relationship shown in FIG. 10a, the region corresponding to the rectangle 40 intersects with the obstacles D, E, and F.

The first-type multiple obstacle boundary processing can include: performing the following processing on each obstacle in the at least two obstacles.

An outer contour coordinate set of the obstacle in the target map is determined; from the outer contour coordinate set, a vertex coordinate set $V_A$ corresponding to the obstacle is determined; coordinate points corresponding to the coordinates in the vertex coordinate set $V_A$ are connected, and the rectangle formed by the connection is determined as a boundary of the obstacle. The vertex coordinate set $V_A$ can be expressed as follows:

$$V_A = \{(x_{min}, y_{min}), (x_{min}, y_{max}), (x_{max}, y_{min}), (x_{max}, y_{max})\}.$$

Figure 10A:
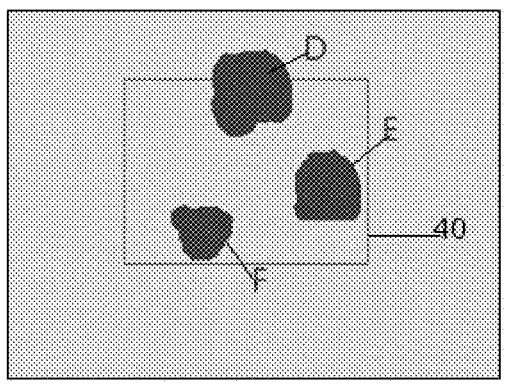
FIG. 10a is a diagram illustrating a position relationship between a rectangle and obstacles.
Figure 10B:
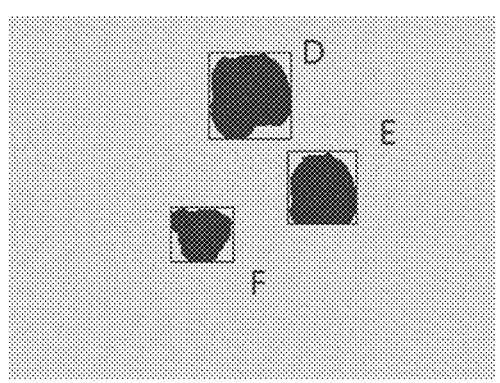
FIG. 10b is a diagram illustrating a result of the obstacles in FIG. 10a that have been subject to a first-type multiple obstacle boundary processing.

After the obstacles D, E and F in FIG. 10a have been subject to the first-type multiple obstacle boundary processing, the processing results can be seen in FIG. 10b.

The second-type multiple obstacle boundary processing can include: determining an outer contour coordinate set in the target map for each obstacle in the at least two obstacles; and from all the determined outer contour coordinate sets, determining a vertex coordinate set $V_B$ of the entire region at which the at least two obstacles are located; sequentially for each x value in a range $[x_{amin}, x_{amax}]$ as a first-type target object, traversing a set of the outer contour coordinate sets $\{S_1, S_2, \ldots S_i \ldots S_N\}$ of the at least two obstacles, to find coordinates with x value as the current first-type target object, obtaining coordinates with the minimum y value and the maximum y value from all the found coordinates corresponding to the current first-type target object, and recording the obtained coordinates into a set $S_x$; sequentially for each y value in a range $[y_{amin}, y_{amax}]$ as a second-type target object, traversing the set of the outer contour coordinate sets $\{S_1, S_2, \ldots S_1 \ldots S_N\}$ of the at least two obstacles, to find coordinates with y value as the current second-type target object, obtaining coordinates with the minimum x value and the maximum x value from all the found coordinates corresponding to the current second-type target object, and recording the obtained coordinates into a set $S_y$; calculating an intersection of the set $S_x$ and the set $S_y$; based on a concave hull algorithm, connecting coordinate points corresponding to the coordinates in the intersection, and determining a closed curve formed by the connection as a multiple obstacle boundary corresponding to the at least two obstacles. Where N is the number of obstacles in the scene region corresponding to the marker line.

The vertex coordinate set $V_B$ can be expressed as follows:

$$V_B = \{(x_{a\ min}, y_{a\ min}), (x_{a\ min}, y_{a\ max}), (x_{a\ max}, y_{a\ min}), (x_{a\ max}, y_{a\ max})\}.$$

where $x_{amin}$ is the minimum value in the x direction in the vertex coordinate set $V_B$; $x_{amax}$ is the maximum value in the x direction in the vertex coordinate set $V_B$; $y_{amin}$ is the minimum value in the y direction in the vertex coordinate set $V_B$; $y_{amax}$ is the maximum value in the y direction of the vertex coordinate set of all obstacles in the scene region corresponding to the marker line.

For each of the obstacles in the scene region corresponding to the marker line, a corresponding vertex coordinate set can be obtained. As shown in FIG. 10a, obstacles D, E, and F exist in the marker line 40, and corresponding respective vertex coordinate sets can be obtained. In the above three vertex coordinate sets, the minimum value $x_{amin}$ and maximum value $x_{amax}$ in the x direction, and the minimum value $y_{amin}$ and maximum value $y_{amax}$ in the y direction are found. The vertex coordinate set composed of these maximum and minimum values is $V_B$.

For example, assuming there are three obstacles, the outer contour coordinate set corresponding to obstacle 1 has 5 coordinates, the outer contour coordinate set corresponding to obstacle 2 has 7 coordinates, and the outer contour coordinate set corresponding to obstacle 3 has 5 coordinates. Then, the vertex coordinate set $V_B$ is extracted from the coordinate set of the entire region having 17 coordinates.

In addition, if the range is $[x_{amin}=5, x_{amax}=8]$, then the x-values of 5, 6, 7, and 8 will be respectively used as the first-type target object to traverse the set of outer contour coordinate sets; similarly, assuming the range is $[y_{amin}=10, y_{amax}=20]$, then the y values of 10, 11, 12, . . . 20 are respectively used as the second-type target object to traverse the set of outer contour coordinate sets.

In addition, the concave hull algorithm includes, but is not limited to, a rolling ball method and an Alpha shape algorithm. For example, the basic principle of the rolling ball method is:
(1) first taking a point with the minimum Y value (taking the maximum X value if the Y values are the same) as an initial point;
(2) starting from the initial point, identifying the closest point in the point set as an initial edge, at this time, a circle with a given radius R is just on the chord and thus a first initial chord is found;
(3) searching for the next chord iteratively; if the previous chord is DE, to find the next chord, starting from E, connecting to a point F in an R field of E; to find point F, the following principle can be applied: for points in the R field of E, by taking E as the center and a ED vector as a reference, sorting in polar coordinate direction; after that, sequentially for a point Fi (i is in [1, N)) in the R field, establishing a circle with EFi as a chord, then checking whether the circle contains other points, if the circle does not contain other points and the length of the chord is less than a given threshold, EFi is a new chord; otherwise, searching in a range with a temporary radius R being a half of a farthest distance of two points in the point set, to find a chord EFi with the shortest length in the chords each having an angle with the chord DE less than a given threshold, as a new chord;
(4) sequentially finding all the chords until it can't find a new chord or find a point that was previously on a chord.

The basic principle of an Alpha shape algorithm is: on the basis of the convex hull, setting a parameter α. In the process of Alpha shape reconstruction, it will not connect vertices that are too far away like the convex hull. If the parameter α tend to be infinite, then this Alpha shape will be extremely close to the convex hull; if α is less, the alpha shape will tend to be recessed in a certain position to better fit the shape of the point set.

Figure 10C:
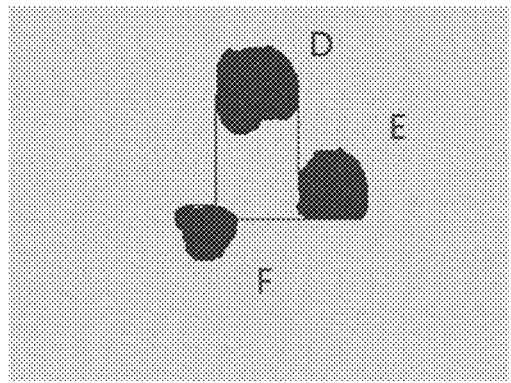
FIG. 10c is a diagram illustrating a result of the obstacles in FIG. 10a that have been subject to a second-type multiple obstacle boundary processing.

After the obstacles D, E, and F in FIG. 10a have been subjected to the second-type multiple obstacle boundary processing, the processing results can be seen in FIG. 10c.

It should be noted that the above implementation of performing boundary refinement processing on the user-defined cleaning region based on the obstacle coordinate information and the marker line is merely an example, and should not constitute a limitation on the example of the present disclosure.

Figure 11:
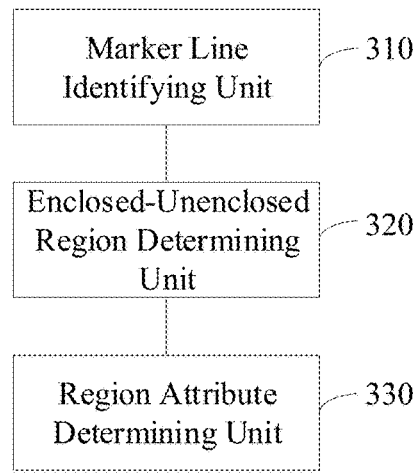
FIG. 11 is a block diagram illustrating an apparatus for determining a region attribute according to an example of the present disclosure.

Corresponding to the method example above, an example of the present disclosure further provides an apparatus for determining a region attribute. As shown in FIG. 11, the apparatus can include a marker line identifying unit 310, an enclosed-unenclosed region determining unit 320, and a region attribute determining unit 330.

The marker line identifying unit 310 is configured to identify a marker line in a target map. The target map is a map of a to-be-cleaned target scene, which the intelligent cleaning device relies on during a cleaning process.

The enclosed-unenclosed region determining unit 320 is configured to determine an unenclosed region with a first position as a reference point and an enclosed region in the target map, based on the identified marker line and an auxiliary object in the target map. The auxiliary object includes a map boundary and an obstacle, and the first position is a position of a preset reference object in the target map.

The region attribute determining unit 330 is configured to determine the enclosed region as a user-defined cleaning region for the cleaning process of the intelligent cleaning device, and determine the unenclosed region as a normal cleaning region for the cleaning process of the intelligent cleaning device.

In the solution provided by the present disclosure, the user can provide a marker line in the target map to partition the region according to the cleaning demands, and then the marker line in the target map is identified during process of determining the region attribute. Based on the identified marker line and an auxiliary object in the target map, an unenclosed region and an enclosed region are determined, and the unenclosed region is determined as a normal cleaning region and the enclosed region is determined as a user-defined cleaning region. Since this solution does not require a virtual wall device, and intelligent region partitioning can be performed based on the user's personalized cleaning demands, so the problems of high cost and inconvenience caused by the implementation of intelligent region partitioning in the prior art can be solved.

Optionally, the marker line can include a straight line or a polyline.

Correspondingly, the enclosed region is a region enclosed by the marker line and the target auxiliary object and excluding the first position. The target auxiliary object is an auxiliary object that intersects with the marker line in the target map.

Optionally, the marker line can include a polygon.

Correspondingly, the enclosed region is a region enclosed by sides of the polygon.

Optionally, the preset reference object includes any one or more of the following:
a charging pile of the intelligent cleaning device, or a non-movable object in the target scene other than the charging pile.

Figure 12:
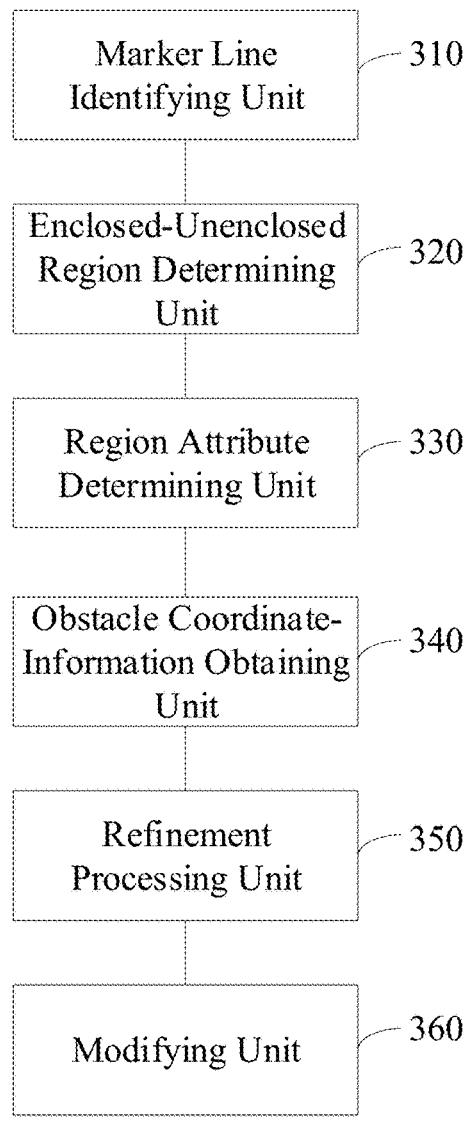
FIG. 12 is a schematic block diagram of an apparatus for determining a region attribute according to another example of the present disclosure.

Optionally, when the polygon is a rectangular, as shown in FIG. 12, the apparatus can further include an obstacle coordinate-information obtaining unit 340, a refinement processing unit 350, and a modifying unit 360.

The obstacle coordinate-information obtaining unit 340 is configured to obtain current obstacle coordinate information in the target scene, where the obstacle coordinate information is information obtained by the intelligent cleaning device performing obstacle detection on the target scene.

The refinement processing unit 350 is configured to perform boundary refinement processing on the user-defined cleaning region based on the obstacle coordinate information and the marker line.

The modifying unit 360 is configured to modify the normal cleaning region based on the processing result obtained by the refinement processing unit 350.

Optionally, the refinement processing unit 350 is specifically configured to, based on the obstacle coordinate information, upon determining that there is no obstacle in the scene region corresponding to the marker line, perform the following operations.

First notification information for prompting whether the marking is a mistake is output; when the result fed back by the user based on the first notification information is yes, a new marker line is identified, a new enclosed region corresponding to the identified new line is determined, and the user-defined cleaning region is adjusted to the new enclosed region.

Furthermore, the refinement processing unit 350 is specifically configured to: based on the obstacle coordinate information, upon determining that a distance between a scene region of the nearest obstacle and a scene region corresponding to the marker line is shorter than a predetermined distance threshold, perform the following operations.

Second notification information for prompting whether to perform region adjustment based on the nearest obstacle is output; when the result fed back by the user based on the second notification information is yes, a single obstacle boundary processing on the target map is performed on the nearest obstacle to obtain a first obstacle boundary, and the user-defined cleaning region is adjusted to the region enclosed by the first obstacle boundary. The nearest obstacle is the obstacle with the closest distance from the scene region corresponding to the marker line in the target scene.

Optionally, the refinement processing unit 350 is specifically configured to:

based on the obstacle coordinate information, upon determining that the scene region corresponding to the marker line intersects with a single obstacle, the following operations are performed.

An area ratio of the intersecting portion to the intersected obstacle is determined.

When the area ratio is larger than a predetermined ratio threshold, a single obstacle boundary processing on the target map is performed on the intersected obstacle to obtain a second obstacle boundary.

The user-defined cleaning region is adjusted to a region enclosed by the second obstacle boundary.

When the area ratio is not larger than a predetermined ratio threshold, third notification information for prompting whether the marking is a mistake is output. When the result fed back by the user based on the third notification information is yes, a new marker line is identified, a new enclosed region corresponding to the identified new marker line is determined, and the user-defined cleaning region is adjusted to the new enclosed region. Alternatively, a single obstacle boundary processing on the target map is performed on the intersected obstacle to obtain a third obstacle boundary, and the user-defined cleaning region is adjusted to a region enclosed by the third obstacle boundary.

Optionally, the refinement processing unit 350 is specifically configured to:

based on the obstacle coordinate information, upon determining that the scene region corresponding to the marker line intersects with at least two obstacles respectively, perform a multiple obstacle boundary processing on the target map on the at least two obstacles that are respectively intersected, to obtain a fourth obstacle boundary; and adjust the user-defined cleaning region to a region enclosed by the fourth obstacle boundary.

Optionally, the single obstacle boundary processing includes:

determining an outer contour coordinate set of the single obstacle in the target map;

determining a vertex coordinate set $V_A$ corresponding to the obstacle from the outer contour coordinate set as:

$$V_A = \{(x_{min}, y_{min}), (x_{min}, y_{max}), (x_{max}, y_{min}), (x_{max}, y_{max})\};$$

connecting coordinate points corresponding to coordinates in the vertex coordinate set $V_A$ and determining a rectangle formed by the connection as a boundary of the obstacle.

Optionally, the multiple obstacle boundary processing can include:

performing a single obstacle boundary processing on each obstacle in the multiple obstacles.

Optionally, the multiple obstacle boundary processing can include:

determining an outer contour coordinate set of each obstacle in the at least two obstacles in the target map;

determining a vertex coordinate set $V_B$ of the entire region at which the at least two obstacles are located from all outer contour coordinate sets determined;

sequentially taking each x value in a range $[x_{amin}, x_{amax}]$ as a first-type target object, traversing a set of the outer contour coordinate sets $\{S_1, S_2, \ldots S_i \ldots S_N\}$ of the at least two obstacles, to find coordinates with x values as the current first-type target object, obtaining coordinates with the minimum y value and the maximum y value from all the found coordinates corresponding to the current first-type target object, and recording the obtained coordinates into a set $S_x$;

sequentially taking each y value in a range $[y_{amin}, y_{amax}]$ as a second-type target object, traversing a set of the outer contour coordinate sets $\{S_1, S_2, \ldots S_i \ldots S_N\}$ of the at least two obstacles, to find coordinates with y value as the current second-type target object, obtaining coordinates with the minimum x value and the maximum x value from all the found coordinates corresponding to the current second-type target object, and recording the obtained coordinates into a set $S_y$;

determining an intersection of the set $S_x$ and the set $S_y$ is calculated; based on a concave hull algorithm, connecting coordinate points corresponding to the coordinates in the intersection; and determining a closed curve formed by the connection as a multiple obstacle boundary corresponding to the at least two obstacles.

Figure 13:
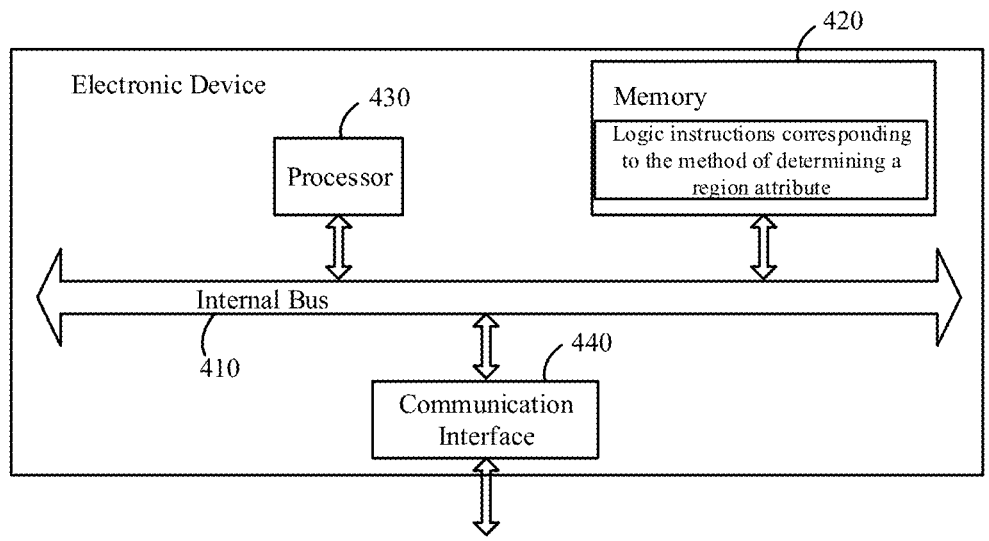
FIG. 13 is a schematic block diagram of an electronic device according to an example of the present disclosure.

In addition, the present disclosure also provides an electronic device. As shown in FIG. 13, the electronic device includes: an internal bus 410, a memory 420, a processor 430, and a communications interface 440; wherein, the processor 430, the communication interface 440, and the memory 420 communicate with each other through the internal bus 410.

The memory 420 is configured to store machine-executable instructions corresponding to the method of determining a region attribute.

The processor 430 is configured to read the machine-readable instructions on the memory 420 and execute the instructions to implement the following operations.

A marker line in a target map is identified. The target map is a map of a to-be-cleaned target scene, which the intelligent cleaning device relies on during a cleaning process.

An enclosed region and an unenclosed region with a first position as a reference point in the target map is determined, based on the identified marker line and an auxiliary object in the target map. The auxiliary object includes a map boundary and an obstacle, and the first position is a position of a preset reference object in the target map.

The enclosed region is determined as a user-defined cleaning region for the cleaning process of the intelligent cleaning device, and the unenclosed region is determined as a normal cleaning region for the cleaning process of the intelligent cleaning device.

For the related description of the specific steps of the method of determining a region attribute, reference can be made to the description in the method example of the present disclosure, which will not be described herein. In addition, it should be noted that the electronic device can be an intelligent cleaning device or a cloud server corresponding to the intelligent cleaning device.

The memory 420 can be, for example, a non-volatile memory. The processor 430 can invoke and execute a logic instruction in the memory 420 that implements the method of determining a region attribute, to perform the method of determining a region attribute.

Figure 14:
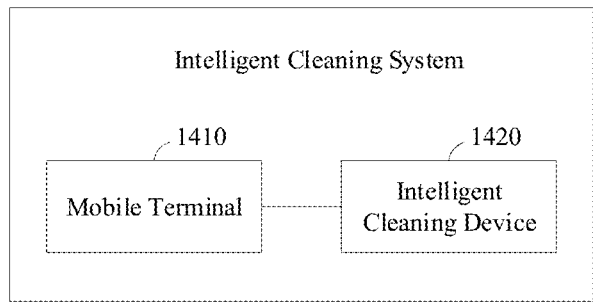
FIG. 14 is a schematic block diagram of an intelligent cleaning system according to an example of the present disclosure.

In addition, corresponding to the method examples, the present disclosure also provides an intelligent cleaning system. As shown in FIG. 14, the intelligent cleaning system includes: a mobile terminal 1410 and an intelligent cleaning device 1420.

The mobile terminal 1410 is configured to obtain a user instruction about a marker line in a target map, and send the user instruction to the intelligent cleaning device 1420, so that the intelligent cleaning device 1420 identifies the marker line in the target map based on the user instruction. The target map is a map of a to-be-cleaned target scene, which the intelligent cleaning device relies on during a cleaning process.

The intelligent cleaning device 1420 is configured to identify the marker line in a target map; determine an enclosed region and an unenclosed region with a first position as a reference point in the target map, based on the identified marker line and an auxiliary object in the target map, wherein the auxiliary object includes a map boundary and an obstacle, and the first position is a position of a preset reference object in the target map; determine the enclosed region as a user-defined cleaning region for the cleaning process of the intelligent cleaning device 1420, and determine the unenclosed region as a normal cleaning region for the cleaning process of the intelligent cleaning device 1420; and clean the target scene based on the determined user-defined cleaning region and normal cleaning region.

In specific applications, the intelligent cleaning device 1420 includes, but is not limited to, a cleaning robot. The cleaning robot is also called an automatic cleaning machine, an intelligent vacuum cleaner, a robot vacuum cleaner, and the like. The mobile terminal 1410 includes, but is not limited to, a smart phone, a tablet computer, and a notebook computer. In addition, the mobile terminal 1410 can display a target map, and the user can issue user instructions about the marker line in the target map, such as issuing a user instruction by drawing a marker line or issuing a user instruction by giving coordinate information. The target map in the intelligent cleaning device 1420 can be constructed by the intelligent cleaning device per se, or can be obtained by sharing with other devices.

For the description of the specific steps of the method of determining a region attribute, reference can be made to the description in the method example of the present disclosure, and details are not described herein.

Since the present solution does not require a virtual wall device, intelligent region partitioning can be performed based on the user's personalized cleaning demands. Therefore, the problems of high cost and inconvenience caused by implementing intelligent region partitioning in the prior art can be solved.

Figure 15:
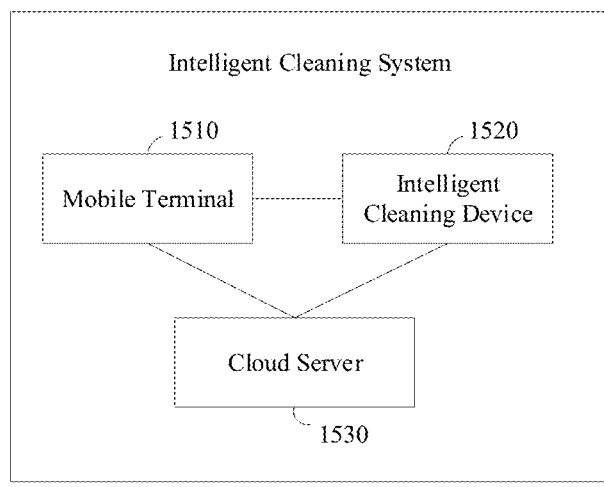
FIG. 15 is a schematic block diagram of an intelligent cleaning system according to another example of the present disclosure.

In addition, based on the method example, the present disclosure also provides an intelligent cleaning system. As shown in FIG. 15, the intelligent cleaning system includes a mobile terminal 1510, a cloud server 1530, and an intelligent cleaning device 1520.

The mobile terminal 1510 is configured to obtain a user instruction about a marker line in a target map, and send the user instruction to the cloud server 1530, so that the cloud server 1530 identifies the marker line in the target map based on the user instruction. The target map is a map of a to-be-cleaned target scene, which the intelligent cleaning device relies on during a cleaning process.

The cloud server 1530 is configured to identify the marker line in a target map; and determine an enclosed region and an unenclosed region with a first position as a reference point in the target map, based on the identified marker line and an auxiliary object in the target map, wherein the auxiliary object includes a map boundary and an obstacle, and the first position is a position of a preset reference object in the target map; determine the enclosed region as a user-defined cleaning region for the cleaning process of the intelligent cleaning device 1520, and determine the unenclosed region as a normal cleaning region for the cleaning process of the intelligent cleaning device 1520.

The intelligent cleaning device 1520 is configured to clean the target scene based on the user-defined cleaning region and normal cleaning region determined by the cloud server 1530.

In specific applications, the intelligent cleaning device 1520 includes, but is not limited to, a cleaning robot. The cleaning robot is also called an automatic cleaning machine, an intelligent vacuum cleaner, a robot vacuum cleaner, and the like. The mobile terminal 1510 includes, but is not limited to, a smart phone, a tablet computer, and a notebook computer. In addition, the mobile terminal 1510 can display a target map, and the user can issue user instructions about the marker line in the target map, such as issuing a user instruction by drawing a marker line or issuing a user instruction by giving coordinate information. The target map in the cloud server 1530 can be constructed by the intelligent cleaning device per se, or can be obtained by sharing with other devices.

For the description of the specific steps of the method of determining a region attribute, reference can be made to the description in the method example of the present disclosure, and details are not described herein.

Since the present solution does not require a virtual wall device, intelligent region partitioning can be performed based on the user's personalized cleaning demands. Therefore, the problems of high cost and inconvenience caused by implementing intelligent region partitioning in the prior art can be solved.

If the function of the logic instruction that implements the method of determining a region attribute is implemented in the form of a software functional unit and sold or used as an independent product, it can be stored in a computer-readable storage medium. Based on this understanding, the technical solution of the present disclosure is embodied in the form of a software product in essence or in a part that contributes to the prior art or in a part of the technical solution. The computer software product is stored in a storage medium, including some instructions than can cause a computer device (which can be a personal computer, a server, or a network device, etc.) to perform all or part of the steps of the method described in each example of the present invention. The storage medium includes: a U disk, a mobile hard disk, a read-only memory (ROM, Read-Only Memory), a random access memory (RAM), a magnetic disk or an optical disk and other media that can store program codes. Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The above are only preferred examples of the present disclosure, and are not intended to limit the present disclosure. Any modification, equivalent replacement, or improvement made within the spirit and principles of the present disclosure shall be included within the scope of the present disclosure.

The invention claimed is:

1. A computer-implemented method of determining a region attribute realized by a computer software, wherein the computer software runs on any one of an intelligent cleaning device, a cloud server providing management services for the intelligent cleaning device, or a mobile terminal of a user of the intelligent cleaning device, and the mobile terminal communicates with at least one of the intelligent cleaning device or the cloud server, and the method comprising:

in response to a user instruction about a marker line sent by the user for a target map displayed on the mobile terminal or a display screen of the intelligent cleaning device, identifying a marker line in the target map, wherein the target map is a map of a to-be-cleaned target scene;

determining, based on the identified marker line and an auxiliary object in the target map, an unenclosed region with a first position as a reference point and an enclosed region in the target map, wherein the auxiliary object includes a map boundary and an obstacle, and the first position is a position of a preset reference object in the target map;

determining the enclosed region as a user-defined cleaning region;

determining the unenclosed region as a normal cleaning region such that the intelligent cleaning device cleans the target scene based on the user-defined cleaning region and the normal cleaning region, wherein the marker line comprises a polygon, the polygon is a rectangle, and the method further comprises:

obtaining current obstacle coordinate information in the to-be-cleaned target scene, wherein the obstacle coordinate information is obtained through:

detecting, by the intelligent cleaning device, coordinates of the obstacle in a coordinate system with the intelligent cleaning device as a origin on the to-be-cleaned target scene with one or more of a radar, a laser, an ultrasound, a visual camera of the intelligent cleaning device, and converting the coordinates of the obstacle in the coordinate system with the intelligent cleaning device as the origin into coordinates of the obstacle in a world coordinate system;

performing boundary refinement processing on the user-defined cleaning region based on the obstacle coordinate information and the marker line; and modifying the normal cleaning region based on a processing result obtained by performing the boundary refinement processing, and wherein performing the boundary refinement processing on the user-defined cleaning region based on the obstacle coordinate information and the marker line comprises:

determining, based on the obstacle coordinate information, a position relationship between the obstacle and a scene region corresponding to the marker line; and performing boundary refinement processing on the user-defined cleaning region based on the position relationship and a number of obstacles, wherein, for cleaning the target scene based on the user-defined cleaning region and the normal cleaning region, coordinates of the intelligent cleaning device in the world coordinate system at a moment next to a current moment is determined based on the coordinates of the intelligent cleaning device in the world coordinate system at the current moment, respective distances travelled by a left wheel and a right wheel of the intelligent cleaning device, travelling direction of the intelligent cleaning device, and a distance between the left wheel and the right wheel.

2. The computer-implemented method according to claim 1, wherein:

the marker line comprises at least one of a straight line or a polyline;

the enclosed region is a region enclosed by the marker line and a target auxiliary object and excluding the first position; and the target auxiliary object is an auxiliary object that intersects with the marker line in the target map.

3. The computer-implemented method according to claim 1, wherein:

the enclosed region is a region enclosed by sides of the polygon.

4. The computer-implemented method according to claim 1, wherein the preset reference object comprises at least one of:

a charging pile of the intelligent cleaning device, or a non-movable objects in the to-be-cleaned target scene other than the charging pile.

5. The computer-implemented method according to claim 1, wherein performing the boundary refinement processing on the user-defined cleaning region based on the obstacle coordinate information and the marker line comprises:

in response to determining based on the obstacle coordinate information that there is no obstacle in a scene region corresponding to the marker line, outputting first notification information for prompting whether marking of the marker line was a mistake;

in response to a result fed back by a user based on the first notification information indicating that the marking of the marker line was a mistake, identifying a new marker line;

determining a new enclosed region corresponding to the identified new marker line, and adjusting the user-defined cleaning region to the new enclosed region.

6. The computer-implemented method according to claim 1, wherein performing the boundary refinement processing on the user-defined cleaning region based on the obstacle coordinate information and the marker line comprises:

determining, based on the obstacle coordinate information, whether a distance between a nearest obstacle and a scene region corresponding to the marker line is shorter than a predetermined distance threshold, wherein the nearest obstacle is an obstacle with the closest distance from the scene region corresponding to the marker line in the to-be-cleaned target scene, in response to determining that the distance between the nearest obstacle and the scene region corresponding to the marker line is shorter than the predetermined distance threshold, outputting second notification information for prompting whether to perform region adjustment based on the nearest obstacle;

in response to a result fed back by a user based on the second notification information being a particular value, performing a single obstacle boundary processing in the target map on the nearest obstacle to obtain a first obstacle boundary, and adjusting the user-defined cleaning region to a region enclosed by the first obstacle boundary.

7. The computer-implemented method according to claim 6, wherein the single obstacle boundary processing comprises:

determining an outer contour coordinate set of a single obstacle in the target map;

determining, from the outer contour coordinate set, a vertex coordinate set $V_A$ corresponding to the obstacle;

connecting coordinate points corresponding to coordinates in the vertex coordinate set $V_A$; and determining a rectangle formed by the connection as a boundary of the obstacle.

8. The computer-implemented method according to claim 1, wherein performing the boundary refinement processing on the user-defined cleaning region based on the obstacle coordinate information and the marker line comprises:

in response to determining based on the obstacle coordinate information that a scene region corresponding to the marker line intersects with a single obstacle, determining an area ratio of the intersecting portion to the intersected obstacle;

when the area ratio is larger than a predetermined ratio threshold, performing a single obstacle boundary processing in the target map on the intersected obstacle to obtain a second obstacle boundary, and adjusting the user-defined cleaning region to a region enclosed by the second obstacle boundary;

when the area ratio is not larger than the predetermined ratio threshold, performing at least one of:

outputting third notification information for prompting whether marking of the marker line was a mistake, in response to a result fed back by a user based on the third notification information indicating that the marking of the marker line was a mistake, identifying a new marker line, determining a new enclosed region corresponding to the identified new marker line, and adjusting the user-defined cleaning region to the new enclosed region; or performing a single obstacle boundary processing in the target map on the intersected obstacle to obtain a third obstacle boundary, and adjusting the user-defined cleaning region to a region enclosed by the third obstacle boundary.

9. The computer-implemented method according to claim 1, wherein performing the boundary refinement processing on the user-defined cleaning region based on the obstacle coordinate information and the marker line comprises:

in response to determining based on the obstacle coordinate information that a scene region corresponding to the marker line intersects with at least two obstacles respectively, performing a multiple obstacle boundary processing in the target map on the at least two obstacles that are respectively intersected to obtain a fourth obstacle boundary; and adjusting the user-defined cleaning region to a region enclosed by the fourth obstacle boundary.

10. The computer-implemented method according to claim 9, wherein the multiple obstacle boundary processing comprises:

for each of the at least two obstacles, performing a single obstacle boundary processing.

11. The computer-implemented method according to claim 9, wherein the multiple obstacle boundary processing comprises:

determining an outer contour coordinate set of each of the at least two obstacles in the target map;

determining a vertex coordinate set $V_B$ of an entire region at which the at least two obstacles are located from all outer contour coordinate sets determined;

sequentially taking each x value in a range $[x_{amin}, x_{amax}]$ as a first-type target object, the sequentially taking of each x value comprising:

traversing a set of the outer contour coordinate sets $\{S_1, S_2, \ldots S_i \ldots S_N\}$ of the at least two obstacles, to find coordinates with x values as the current first-type target object;

obtaining coordinates with the minimum y value and the maximum y value from all found coordinates corresponding to the current first-type target object; and recording the obtained coordinates into a set $S_x$, wherein N is the number of obstacles in the scene region corresponding to the marker line, $x_{amin}$ is the minimum value in an x direction in the vertex coordinate set $V_B$; and $x_{amax}$ is the maximum value in the x direction in the vertex coordinate set $V_B$;

sequentially taking each y value in a range $[y_{amin}, y_{amax}]$ as a second-type target object, the sequentially taking of each y value comprising:

traversing the set of the outer contour coordinate sets $\{S_1, S_2, \ldots S_i \ldots S_N\}$ of the at least two obstacles, to find coordinates with y value as the current second-type target object;

obtaining coordinates with the minimum x value and the maximum x value from all found coordinates corresponding to the current second-type target object; and recording the obtained coordinates into a set $S_y$, wherein $y_{amin}$ is the minimum value in a y direction in the vertex coordinate set $V_B$; and $y_{amax}$ is the maximum value in the y direction in the vertex coordinate set $V_B$;

determining an intersection of the set $S_x$ and the set $S_y$;

connecting, based on a concave hull algorithm, coordinate points corresponding to the coordinates in the intersection; and determining a closed curve formed by the connection as a multiple obstacle boundary corresponding to the at least two obstacles.

12. An intelligent cleaning device comprising:
an internal bus;
a memory;
a display screen;
a processor; and
a communication interface,
wherein the processor, the communication interface, the display screen and the memory communicate with each other through the internal bus,
wherein the memory is configured to store machine-executable instructions corresponding to a method of determining a region attribute, and
wherein the processor is configured to read the machine-executable instructions on the memory and execute the machine-executable instructions to implement operations including:
in response to a user instruction about a marker line sent by the user for a target map displayed on the display screen of the intelligent cleaning device, identifying the marker line in the target map, wherein the target map is a map of a to-be-cleaned target scene;
determining, based on the identified marker line and an auxiliary object in the target map, an unenclosed region with a first position as a reference point and an enclosed region in the target map, wherein the auxiliary object includes a map boundary and an obstacle, and the first position is a position of a preset reference object in the target map;
determining the enclosed region as a user-defined cleaning region;
determining the unenclosed region as a normal cleaning region such that the intelligent cleaning device cleans the target scene based on the user-defined cleaning region and the normal cleaning region,
wherein the marker line comprises a polygon, the polygon is a rectangle, and the operations further comprise:
obtaining current obstacle coordinate information in the to-be-cleaned target scene, wherein the obstacle coordinate information is obtained through:
detecting, by the intelligent cleaning device, coordinates of the obstacle in a coordinate system with the intelligent cleaning device as a origin on the to-be-cleaned target scene with one or more of a radar, a laser, an ultrasound, a visual camera of the intelligent cleaning device, and
converting the coordinates of the obstacle in the coordinate system with the intelligent cleaning device as the origin into coordinates of the obstacle in a world coordinate system;
performing boundary refinement processing on the user-defined cleaning region based on the obstacle coordinate information and the marker line; and
modifying the normal cleaning region based on a processing result obtained by performing the boundary refinement processing, and wherein performing the boundary refinement processing on the user-defined cleaning region based on the obstacle coordinate information and the marker line comprises:
determining, based on the obstacle coordinate information, a position relationship between the obstacle and a scene region corresponding to the marker line; and
performing boundary refinement processing on the user-defined cleaning region based on the position relationship and a number of obstacles,
wherein, for cleaning the target scene based on the user-defined cleaning region and the normal cleaning region, coordinates of the intelligent cleaning device in the world coordinate system at a moment next to a current moment is determined based on the coordinates of the intelligent cleaning device in the world coordinate system at the current moment, respective distances travelled by a left wheel and a right wheel of the intelligent cleaning device, travelling direction of the intelligent cleaning device, and a distance between the left wheel and the right wheel.

13. The intelligent cleaning device according to claim 12, wherein:
the enclosed region is a region enclosed by sides of the polygon.

14. The intelligent cleaning device according to claim 12, wherein performing the boundary refinement processing on the user-defined cleaning region based on the obstacle coordinate information and the marker line comprises:
in response to determining based on the obstacle coordinate information that there is no obstacle in a scene region corresponding to the marker line, outputting first notification information for prompting whether marking of the marker line was a mistake;
in response to a result fed back by a user based on the first notification information indicating that the marking of the marker line was a mistake, identifying a new marker line;
determining a new enclosed region corresponding to the identified new marker line, and
adjusting the user-defined cleaning region to the new enclosed region.

15. The intelligent cleaning device according to claim 12, wherein performing the boundary refinement processing on the user-defined cleaning region based on the obstacle coordinate information and the marker line comprises:
determining, based on the obstacle coordinate information, whether a distance between the nearest obstacle and a scene region corresponding to the marker line is shorter than a predetermined distance threshold, wherein the nearest obstacle is an obstacle with the closest distance from the scene region corresponding to the marker line in the target scene,
in response to determining that the distance between the nearest obstacle and the scene region corresponding to the marker line is shorter than the predetermined distance threshold, outputting second notification information for prompting whether to perform region adjustment based on the nearest obstacle;
in response to a result fed back by a user based on the second notification information indicating a particular value, performing a single obstacle boundary processing in the target map on the nearest obstacle to obtain a first obstacle boundary, and
adjusting the user-defined cleaning region to a region enclosed by the first obstacle boundary.

16. The intelligent cleaning device according to claim 12, wherein performing the boundary refinement processing on the user-defined cleaning region based on the obstacle coordinate information and the marker line comprises:

in response to determining based on the obstacle coordinate information that a scene region corresponding to the marker line intersects with a single obstacle, determining an area ratio of the intersecting portion to the intersected obstacle;

when the area ratio is larger than a predetermined ratio threshold,
        performing a single obstacle boundary processing in the target map on the intersected obstacle to obtain a second obstacle boundary, and
        adjusting the user-defined cleaning region to a region enclosed by the second obstacle boundary;

when the area ratio is not larger than the predetermined ratio threshold,
        outputting third notification information for prompting whether marking of the marker line was a mistake; in response to a result fed back by a user based on the third notification information indicating a particular value, identifying a new marker line; determining a new enclosed region corresponding to the identified new marker line; and adjusting the user-defined cleaning region to the new enclosed region; or
        performing a single obstacle boundary processing in the target map on the intersected obstacle to obtain a third obstacle boundary, and adjusting the user-defined cleaning region to a region enclosed by the third obstacle boundary.

17. The intelligent cleaning device according to claim 12, wherein performing the boundary refinement processing on the user-defined cleaning region based on the obstacle coordinate information and the marker line comprises:

in response to determining based on the obstacle coordinate information that a scene region corresponding to the marker line intersects with at least two obstacles respectively, performing a multiple obstacle boundary processing in the target map on the at least two obstacles that are respectively intersected to obtain a fourth obstacle boundary; and adjusting the user-defined cleaning region to a region enclosed by the fourth obstacle boundary.

18. An intelligent cleaning system, comprising:
    a mobile terminal; and
    an intelligent cleaning device,
    wherein the mobile terminal is configured to:
        display a target map;
        obtain a user instruction about a marker line sent by a user for the target map, and
        send the user instruction to the intelligent cleaning device, and
    wherein the intelligent cleaning device is configured to:
        based on the user instruction received from the mobile terminal, identify the marker line in the target map;
        determine, based on the identified marker line and an auxiliary object in the target map, an unenclosed region with a first position as a reference point and an enclosed region in the target map, wherein the auxiliary object includes a map boundary and an obstacle, wherein the first position is a position of a preset reference object in the target map;
        determine the enclosed region as a user-defined cleaning region, and determine the unenclosed region as a normal cleaning region;
        clean the target scene based on the determined user-defined cleaning region and normal cleaning region,
    wherein the marker line comprises a polygon, the polygon is a rectangle, and the intelligent cleaning device is further configured to:
        obtain current obstacle coordinate information in the to-be-cleaned target scene, wherein the obstacle coordinate information is obtained through:
            detecting, by the intelligent cleaning device, coordinates of the obstacle in a coordinate system with the intelligent cleaning device as an origin on the to-be-cleaned target scene by with one or more of a radar, a laser, an ultrasound, a visual camera of the intelligent cleaning device, and
            converting the coordinates of the obstacle in the coordinate system with the intelligent cleaning device as the origin into coordinates of the obstacle in a world coordinate system;
        perform boundary refinement processing on the user-defined cleaning region based on the obstacle coordinate information and the marker line; and
        modify the normal cleaning region based on a processing result obtained by performing the boundary refinement processing;
    wherein performing the boundary refinement processing on the user-defined cleaning region based on the obstacle coordinate information and the marker line comprises:
    determining, based on the obstacle coordinate information, a position relationship between the obstacle and a scene region corresponding to the marker line; and
    performing boundary refinement processing on the user-defined cleaning region based on the position relationship and a number of obstacles,
    wherein, for cleaning the target scene based on the user-defined cleaning region and the normal cleaning region, coordinates of the intelligent cleaning device in the world coordinate system at a moment next to a current moment is determined based on the coordinates of the intelligent cleaning device in the world coordinate system at the current moment, respective distances travelled by a left wheel and a right wheel of the intelligent cleaning device, travelling direction of the intelligent cleaning device, and a distance between the left wheel and the right wheel.

* * * * *